(No Model.) 10 Sheets—Sheet 1.

J. BÜHRER.
BRICK KILN.

No. 377,511. Patented Feb. 7, 1888.

WITNESSES:
C. Neveux
A. E. Brinkerhoff INVENTOR:
J. Bührer
BY Munn & Co.
ATTORNEYS.

(No Model.) 10 Sheets—Sheet 2.

J. BÜHRER.
BRICK KILN.

No. 377,511. Patented Feb. 7, 1888.

WITNESSES:
C. Neveux
A. E. Brinkerhoff

INVENTOR:
J. Bührer
BY Munn & Co.
ATTORNEYS.

(No Model.) 10 Sheets—Sheet 3.
J. BÜHRER.
BRICK KILN.

No. 377,511. Patented Feb. 7, 1888.

WITNESSES:
C. Sedgwick
J. M. Ritter

INVENTOR:
J. Bührer
BY Munn &Co
ATTORNEYS.

(No Model.) 10 Sheets—Sheet 4.
J. BÜHRER.
BRICK KILN.

No. 377,511. Patented Feb. 7, 1888.

WITNESSES:
INVENTOR:
BY
ATTORNEYS.

(No Model.) 10 Sheets—Sheet 5.

J. BÜHRER.
BRICK KILN.

No. 377,511. Patented Feb. 7, 1888.

WITNESSES:
C. Neveux
A. E. Brinkerhoff

INVENTOR:
J. Bührer
BY Munn & Co.
ATTORNEYS.

(No Model.) 10 Sheets—Sheet 6.

J. BÜHRER.

BRICK KILN.

No. 377,511. Patented Feb. 7, 1888.

WITNESSES:
C. Neveux
A. E. Brinkerhoff

INVENTOR:
J. Bührer
BY Munn & Co.
ATTORNEYS.

(No Model.) 10 Sheets—Sheet 7.

J. BÜHRER.
BRICK KILN.

No. 377,511. Patented Feb. 7, 1888.

WITNESSES:
C. Sedgwick
J. M. Ritter

INVENTOR:
J. Bührer
BY Munn & Co.
ATTORNEYS.

(No Model.) 10 Sheets—Sheet 8.

J. BÜHRER.
BRICK KILN.

No. 377,511. Patented Feb. 7, 1888.

WITNESSES:
C. Neveux
A. E. Brinkerhoff

INVENTOR:
J. Bührer
BY Munn & C
ATTORNEYS.

(No Model.) 10 Sheets—Sheet 9.
J. BÜHRER.
BRICK KILN.

No. 377,511. Patented Feb. 7, 1888.

WITNESSES: INVENTOR:
C. Neveux J. Bührer
A. E. Brinkerhoff BY Munn & Co.
ATTORNEYS.

(No Model.) 10 Sheets—Sheet 10.
J. BÜHRER.
BRICK KILN.

No. 377,511. Patented Feb. 7, 1888.

Fig. 11ᶜ

WITNESSES:
C. Neveux
C. Sedgwick

INVENTOR:
J. Bührer
BY Munn & Co
ATTORNEYS.

UNITED STATES PATENT OFFICE.

JACOB BÜHRER, OF CONSTANCE, BADEN, GERMANY, ASSIGNOR OF ONE-HALF TO FRANK B. VAN DE VELDE, HENRY J. VAN DE VELDE, AND BERNARD F. VAN DE VELDE, ALL OF CLEVELAND, OHIO.

BRICK-KILN.

SPECIFICATION forming part of Letters Patent No. 377,511, dated February 7, 1888.

Application filed July 21, 1886. Serial No. 208,685. (No model.)

*To all whom it may concern:*

Be it known that I, JACOB BÜHRER, a citizen of Switzerland, residing at Constance, Grand Duchy of Baden, Empire of Germany, have invented certain new and useful Improvements in furnaces or kilns for the burning of brick, tile, terra-cotta, lime, and all kindred substances manufactured from earths, clays, &c.; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Fig. 11 is a sectional plan view showing the two layers of drain-pipes above the combustion-chamber arches. Fig. $1^a$ is a sectional plan view showing the attachment of the independent drying-chambers for the utilization of the heat escaping from the material already burned. Fig. $2^a$ is a horizontal section showing the flues and pipes above the arches looking down. Fig. $4^a$ is a longitudinal section taken on line A B in Fig. $1^a$. Fig. $5^a$ is a transverse section taken on line I K in Fig. $1^a$. Fig. $6^a$ is a longitudinal section taken on line C D in Fig. $1^a$. Fig. $8^a$ is a transverse section taken on line G H in Fig. $1^a$. Fig. $9^a$ is a longitudinal section taken on line E F, Fig. $1^a$. Fig. $10^a$ is a transverse section taken on line L M in Fig. $1^a$. Fig. $11^a$ is a sectional plan view of the kiln, showing the connective flues $r'$ leading from the smoke-slots $r$ to the smoke-collecting chamber R, the connective-flues $W'$ leading from the air-slots W to the main air-flue $7'$, the air-distributing flues $r^o$, and the draft-flues $h^o$ in the drying-chamber. Fig. $12^a$ is a sectional plan view of the kiln, showing the air-flues above the combustion-chamber arches and the connections of the same with the distributing-flues $r^o$ in the drying-apartments. Fig. $9^b$ is an enlarged detail view of one of the chambers of the kiln operated by gas. Fig. $10^b$ shows a plan view of one of the groups of gas-burners and its connection with the air-ducts and a vertical section taken on line R S. Fig. $11^b$ represents a vertical section showing one of the partition-walls, also horizontal sections taken on lines N O and P Q. Fig. $12^b$ is an enlarged sectional plan view of two of the chambers of the gas-firing kiln, showing the manner in which the gas is conducted from the gasometers to the gas-burners. Fig. $10^c$ is a diagrammatical plan view. Fig. $11^c$ is a diagrammatical plan view of the drying-apartments, showing the manner of their operation.

My invention consists of a kiln provided with series of chambers, gas-generators, and gasometers, and with air and gas conduits combined and arranged as hereinafter more fully described.

Figure 1:
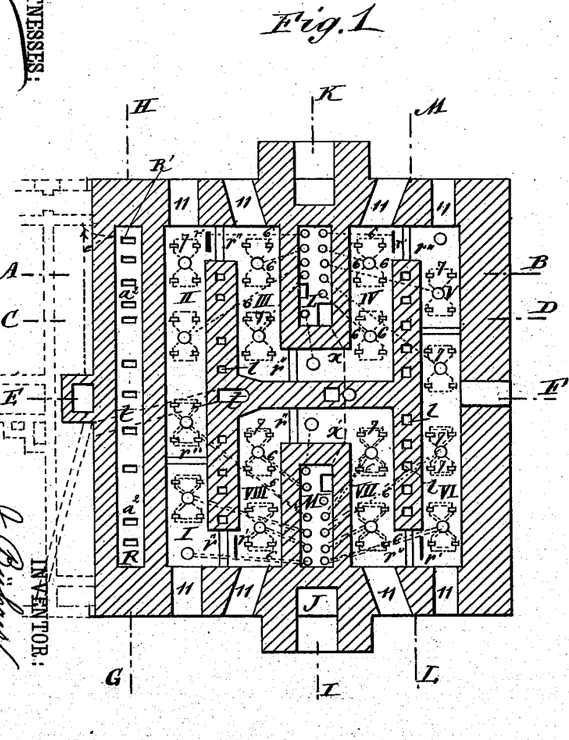
Figure 1 is a ground plan of my improved kiln operated by gas-firing.
Figure 2:
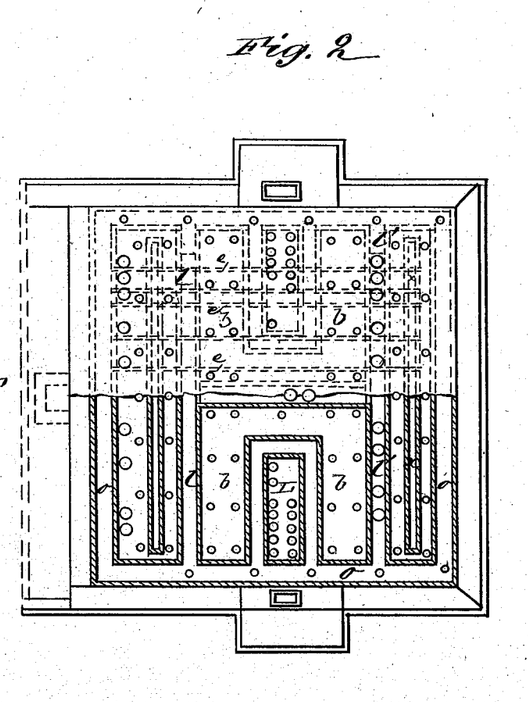
Fig. 2 is a sectional plan view showing the flues and pipes above the arches of the gas-firing kiln.
Figure 2A:
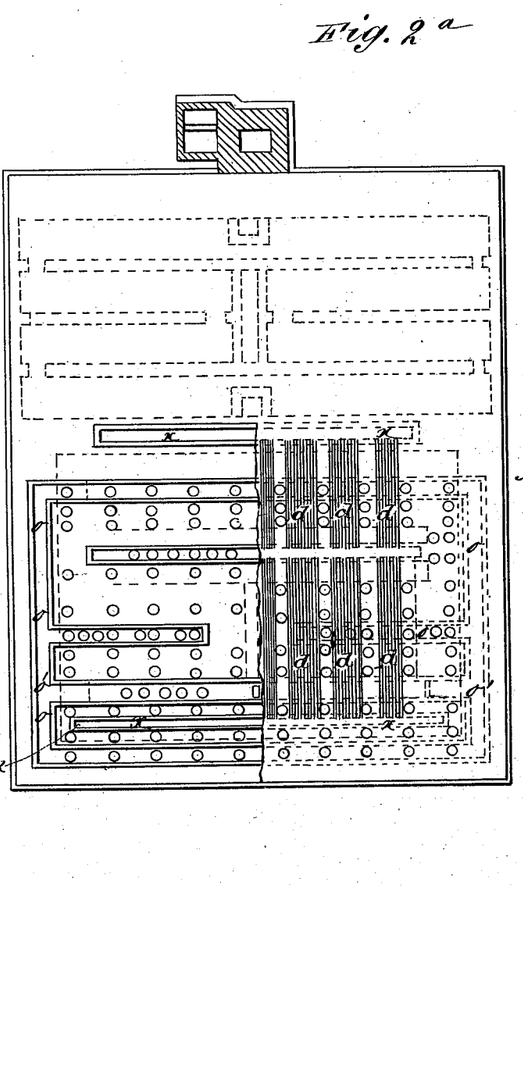
Figure 3:
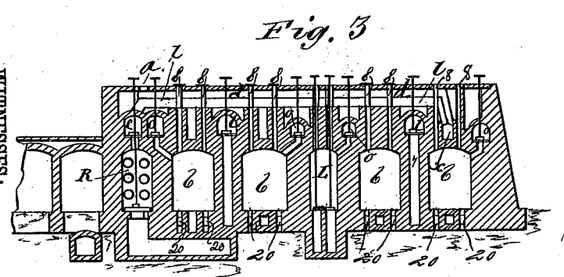
Fig. 3 is a transverse section taken on line A B in Fig. 1.

Fig. 1 illustrates the general arrangement of the kiln, and Figs. 2 and 3 show the combustion-chambers $b$, in which the material intended to be burned is placed.

Figure 6:
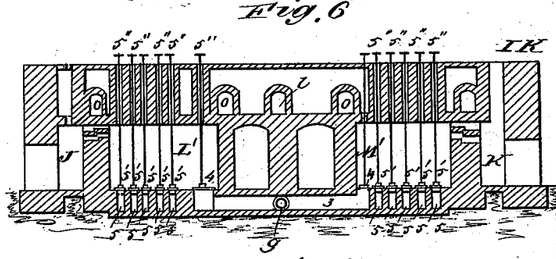
Fig. 6 is a longitudinal section taken on line I K in Fig. 1.

The arches of the chambers $b$ are pierced by stoke-holes extending to the top of the kiln. The upper ends of these stoke-holes are covered by iron covers. The stoke-holes 8 are arranged at regular intervals throughout the entire length of the combustion-chamber arches. The gas is produced in the generators $J'$ $K'$ and delivered to the gasometers $L'$ $M'$, which are connected by a passage, 3, (shown in Figs. 6 and 9,) and communication between the two gasometers is regulated by valves 4 in gasometers L' M'. In the bottoms of the gasometers are openings 5, from which the gas is conducted by pipes 6, as indicated in Fig. $12^b$ and by dotted lines in Fig. 1, to the gas-burners 16 in the combustion-chambers I II III IV V VI VII VIII.

The supply of gas to the burners is controlled by sand-sealed valves 5', covering the openings 5. These valves are provided with rods 5", extending to the top of the kiln, for the purpose of operating the valves.

R is the smoke-collecting chamber, in the bottom of which are nine square holes, $a''$. Eight of these openings $a''$ are connected with the smoke-slots $r$ rising in each chamber, and one of the openings $a''$ is in communication with the passage 3 through the flue $g$, Fig. 9, thus putting the gas-generators in direct connection with the stack or chimney, the stack or chimney being connected directly with the smoke-collecting chamber R, through the passages or channels 19 $a^\circ$ $b^\circ$ $c^\circ$, as shown in Fig. $5^a$. The draft through the smoke-slots is regulated by valves $a^3$, Fig. 4, located in the smoke-collecting chamber and provided with valve-rods $a^4$, which extend to the top of the kiln, as in the other case.

Figure 7:
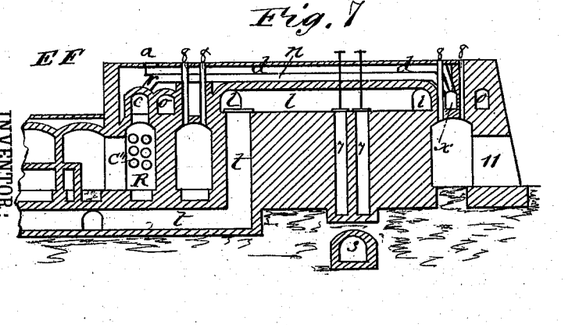
Fig. 7 is a transverse section taken on line E F in Fig. 1.
Figure 8:
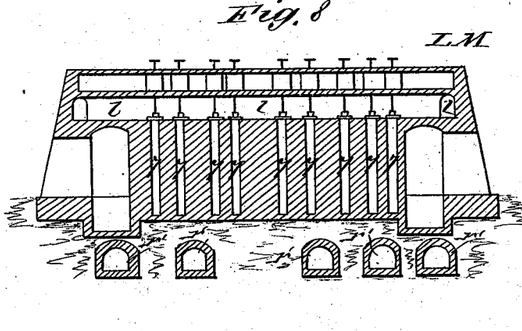
Fig. 8 is a longitudinal section taken on line L M in Fig. 1.

$l$ $l$ are main hot-air flues. (Shown in Figs. 7, 8, and 10.) With these flues the small perpendicular conduits 7 connect, and with the lower ends of the conduits 7 are connected passages or channels 15, (see Fig. $9^b$,) which connect, by passages 20, with the gas-burners 16 in the combustion-chamber floors, (see lower view of Fig. $10^b$,) thus furnishing the gas with superheated air for combustion. These air-connections with the gas-burners also serve to withdraw the heated air out of the material already burned into the flues $l$, when the air-valves are allowed to remain open after the burning process has been completed and when the supply of gas has been shut off.

For the purpose of utilizing all the available heat generated in the operation of the kiln, the surplus heat escaping from the material already burned is conducted to eight or more chambers, in which the manufactured products may be dried previous to burning. These chambers are built independently of the kiln proper.

While considerable heat may be drawn out of the burner-openings, as above described, there is still much heat in the upper portions of the brick which cannot be withdrawn in this way. The passages $o$, in Figs. 2, 5, 7, and 10, communicate with the combustion-chambers $b$, through the openings $o'$, for drawing off the hot air, the flow of air through the passages $o'$ being regulated by suitable valves. The passages $o$ are united with the main air-flues $l$, Figs. 2 and 10.

Figure 4:
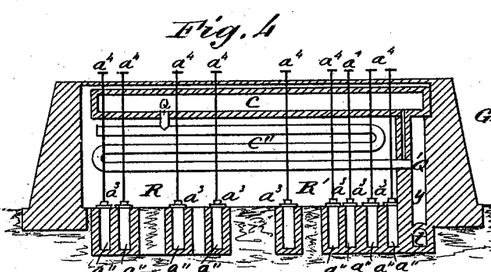
Fig. 4 is a longitudinal section taken on line G H in Fig. 1.
Figure 4A:
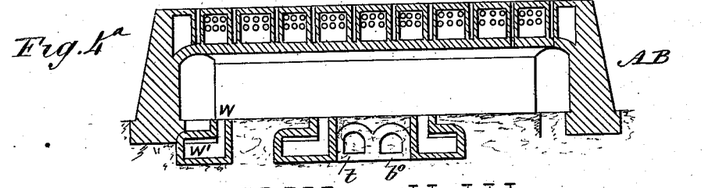
Figure 5:
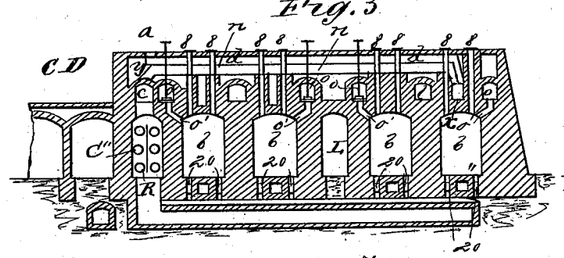
Fig. 5 is a transverse section taken on line C D in Fig. 1.
Figure 5A:
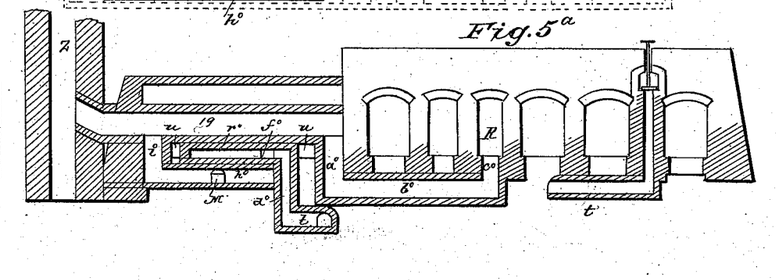

The heat in the smoke-collecting chamber is utilized by the employment of an iron coil of pipe, $c''$, one end of which receives air from the air-passage C at Q, and the opposite end of the coil enters the passage $y$ at Q', as shown in Fig. 4, and the air is heated by its passage through the pipe $c''$ and is conveyed by the passage $y$ to the conduit $t$, leading to the drying-apartments. A large amount of heat is stored in the sand filling over the combustion-chamber arches. This heat is conveyed to the drying-apartments in the following manner: Two layers of drain-pipes $n$ $d$ are placed over the combustion-chamber arches immediately under the top of the kiln.

Figures 11, 12:
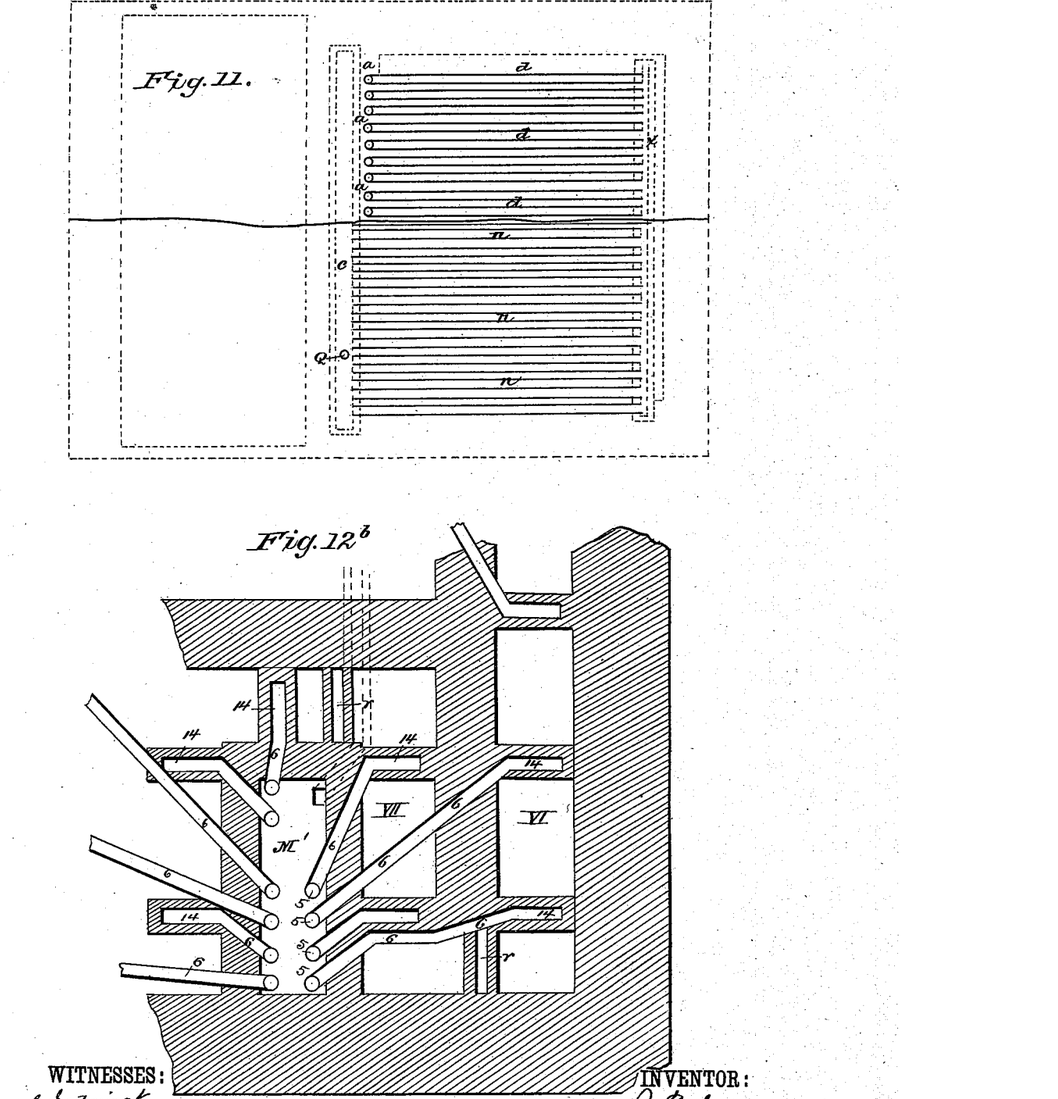

Cold air is admitted through the opening $a$ in the upper layer of pipes, $d$, as shown in Figs. 3, 5, 7, and 11, flows into conduit $x$, thence through the pipes $n$ into the conduit C to the opening Q. Proceeding through the coil $c''$ in the smoke-collecting chamber, it is discharged into the passage $y$, whence it is conveyed by the conduit $t$ to the drying-chambers. (The position of these various pipes and flues is shown in Figs. 2 and 11.)

$d$ and $n$ are the drain-pipes. $x$ is the turning-passage, and C the channel which connects with the passage $y$.

Figure 9:
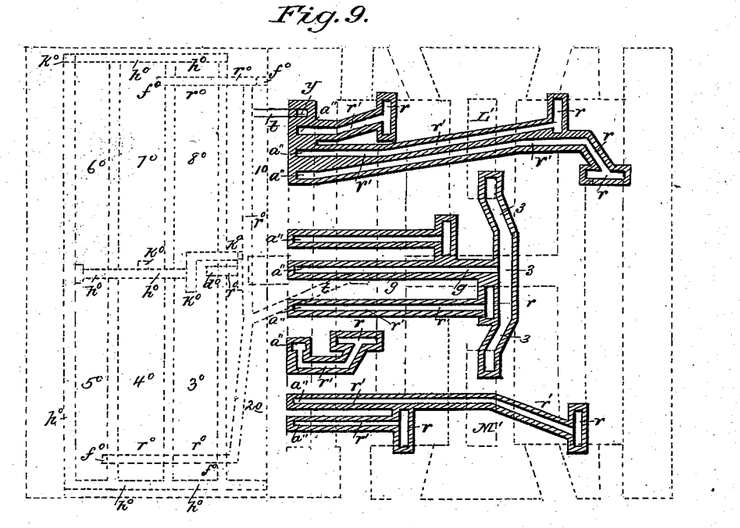
Fig. 9 is a sectional plan view in the gas-firing kiln, showing the connective flues $r'$ between the smoke-slots $r$ and the smoke-collecting chamber R. This figure also shows the arrangement of the draft-flues $h^o$, located under the drying-apartment floors.
Figure 10:
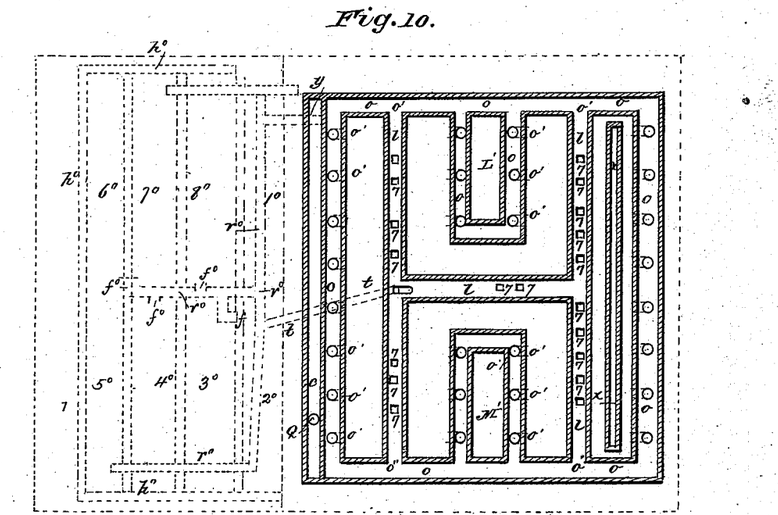
Fig. 10 is a sectional plan view of the gas-firing kiln, showing the air-flues located above the combustion-chamber arches and the arrangement of flues $r^o$ for distributing the heated air to the drying-apartments.
Figure 10A:
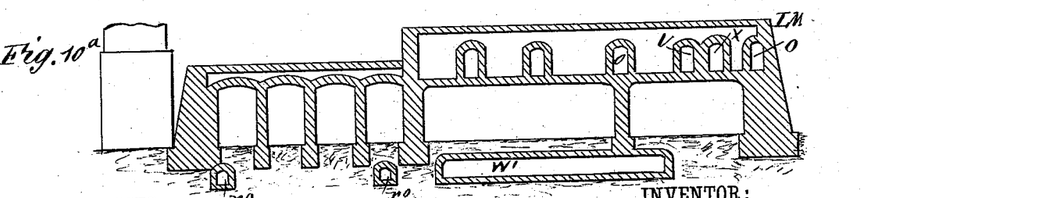

The attachment of the drying-chambers to the gas-firing kiln is shown in Figs. 9 and 10. The flue $t$ conducts the heated air into the distributing-channels $r^\circ$, from whence it is drawn through the ware to be dried, into the draft-flues $h^\circ$, as hereinafter more fully described.

Figure 9B:
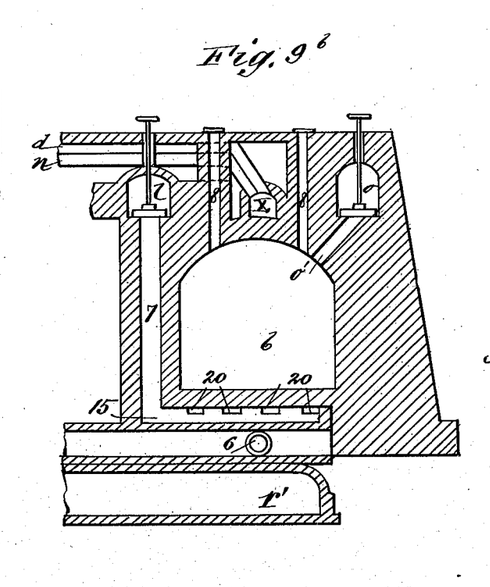

Fig. $9^b$ is an enlarged section of the kiln, which shows the relative position of the gas-pipes and smoke and air flues.

Figure 11A:
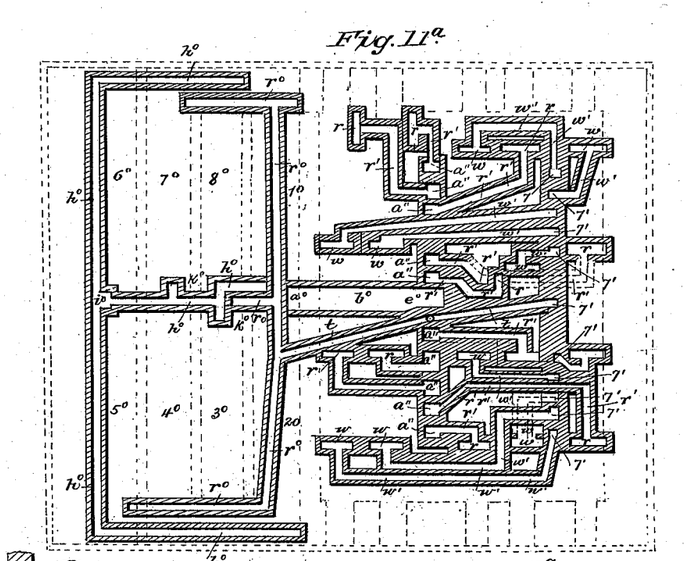
Figure 11B:
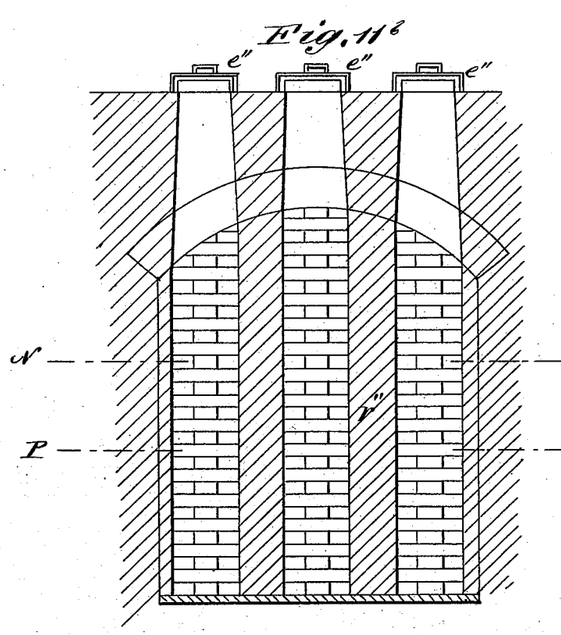

Fig. $11^b$ shows the construction of the division-walls between the combustion-chambers, and N O and P Q are sectional plans of the same. The tops of the flues are covered by iron covers $e''$.

The combustion-chambers may be separated from each other by means of paper dampers covered with clay pasted over the perforations of the flues. When communication between the chambers is to be re-established, these paper dampers are torn off from above through the stoke-holes. These division-walls are indicated by $r''$ in Fig. 1.

Figs. $10^b$ and $12^b$ show, in the gas-firing kiln, the manner in which the gas-burners and their connections with the air-flues are constructed. The gas-pipe 6 enters the small gasometers 14 at one end. The gas is distributed to the burners 16 through openings 18. Hot air is supplied from the conduit 17 to the conduit 15, and from thence, through 20, to the burners, where it is mixed with the gas, combustion taking place above the kiln-floor.

The further description of the details of the kiln will be given in connection with the description of the operation of the kiln, which is as follows:

In the diagrammatical Fig. $10^c$, 11 represents the entrance-doors; $l$, the air-flues; L' M', the gasometers; J' K', the gas-generators; R, the smoke-collecting chamber; I II III IV V VI VII VIII are the combustion-chambers, and $r''$ the partition-walls. The material in the combustion-chambers VI, VII, and VIII, as here represented, has already been burned.

The chambers I II III are filled with material up to the division-wall $r''$, upon which the previously-described clay-covered paper damper $h$ has been placed. The chambers VI, VII, VIII, I, II, and III are in communication with each other, and all the chambers above mentioned, with the exception of chamber VI, are closed air-tight with brick-work; chamber IV is being filled with material and chamber V is being emptied. The burner-groups $i$ are one after another ignited, and the gas-valves behind the portion of the material already burned are closed in succession. The valves controlling the air-conduits leading to chambers VI and VII for conducting the heated air out of the burned material are open, thus insuring a rapid but gradual cooling of the material. When the material in chamber VI is sufficiently cooled, the entrance-door 11 is opened and the finished material or ware is taken out. The damper $h$ is removed from wall $r''$, and a damper, $r'$, is applied to said wall $r''$ of chamber V. The smoke-valve controlling the draft through the slot $r$ in chamber IV is now opened, and the valve controlling the slot $r'$ in chamber III is gradually closed. The flues in the division-walls $r''$, between chambers VI and VII, are then filled from above with fine sand, thus preventing the influx of cold air while the material is being carted out of chamber VI. By means of this sand filling any number of chambers of burned material may be isolated from the other portions of the kiln. In the manner described the heat is made to traverse the entire length of all the combustion-chambers. Every burner-group having a connection with the main air-flue admits of drawing the heated air out of the burned material through the burners into the main air-conduits $l$. In starting the gas-kiln the first three or four chambers are burned by direct firing through the stoke-holes 8. Three or four chambers are placed in communication with each other. The doors are closed air-tight, allowing only one to remain open. Near this open door a temporary fire-box is built, in which a fire is kindled. The division-wall most remote from the open door is covered with a paper damper. The smoke-slot most remote from the open door is put in connection with the smoke-collecting conduit. The fire is thus made to draw through the unburned material. When the lower tier of material has attained red heat, small pieces of coal are fed through the stoke-holes 8. During the process of direct firing the gas-burners in the kiln-floor are temporarily closed by means of a brick or in any other convenient way. When the heat has arrived at the chamber adjoining the last one of the three first fired, being filled with material, the gas is turned on by opening one valve after another, until about five valves are open, the air-valves corresponding with the ignited burner-groups being opened simultaneously. The gaseous fuel striking the mass of red-hot material contained by chamber IV immediately ignites and the heat is drawn through the chambers, as above described.

Figure 1A:
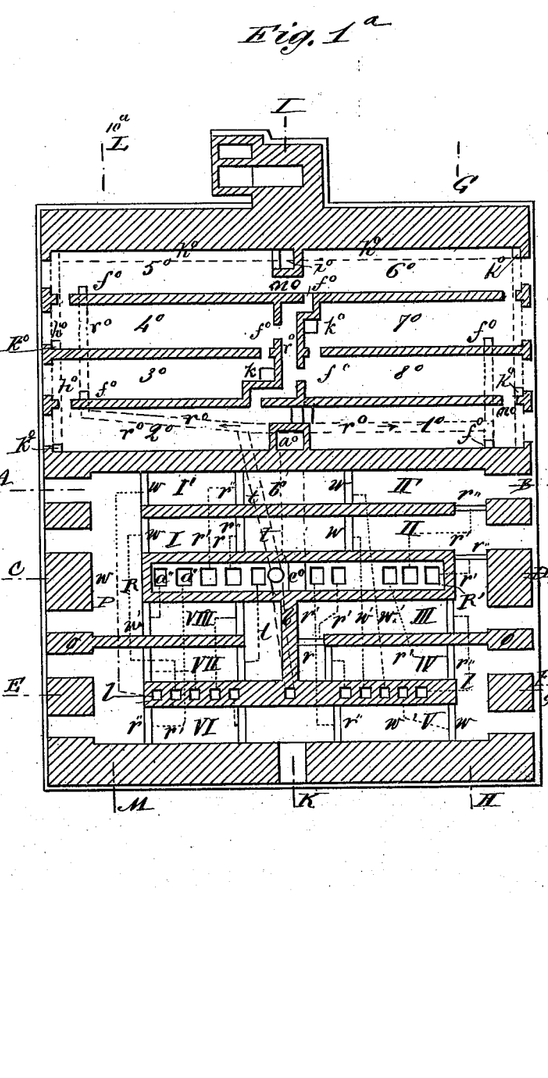

The operation of the direct-firing kiln is similar in most respects to the gas-kiln. The heat is made to travel through the chambers by the manipulation of the smoke-valves. In direct firing combustion takes place on the oven-floor, the fuel being introduced through the stoke-holes 8 after one chamber of the starting-kiln has been heated sufficiently to ignite the coal. The heated air in the burned material is withdrawn through air-slots W, Figs. 1ª and 11ª, in the kiln-floor by the system of passages $o$ on the top of the kiln, and by the entrance-doors 11, and the removal of the covers of the stoke-holes permits the cold air to be drawn through the burned material, and after becoming heated it is discharged into the air-conduits. In my improved gas-kiln perfect combustion is secured. The fuel and air being in a gaseous state they can be intimately mixed in the burners. The supply of fuel and air is under absolute control by the regulating-valves. In both gas and direct-firing kilns the waste heat, which in kilns of ordinary construction escapes into the air, is utilized for drying the brick or other ware previous to burning. The air-conduits absorb the hot air from the heated material, thus insuring a rapid but regular cooling. The kilns are continuous in their operation and the material may be taken out at short intervals of time.

My improved construction permits of making the chambers low, thus avoiding the danger of breakage incident to piling the material to a great height, as in ordinary kilns. The material in cooling off is not exposed to cold-air currents, as all of the chambers are closed air-tight. The heat is equally distributed in the chambers, causing all the material to be burned evenly. This in the case of the manufacture of brick is important, as it insures a uniformity of color. As the heat is not confined to any particular locality in the kiln, the walls are not injured by concentrated heat. The crudest kinds of fuel may be employed in firing the kiln, such as slack, &c. Natural gas may also be used in operating the kiln by omitting the gas generators and introducing the gas into the gasometers. I II III to VIII are the combustion-chambers, and R is the smoke-collecting-conduit. From the smoke-collecting conduit a passage, $c^\circ$, leads to the horizontal flue $b^\circ$. From thence a connection is made with the conduit 19 through the vertical shaft $a^\circ$, as shown in Figs. 5ª and 1ª. Conduit 19 is in direct connection with the chimney.

Figures 8A, 9A:
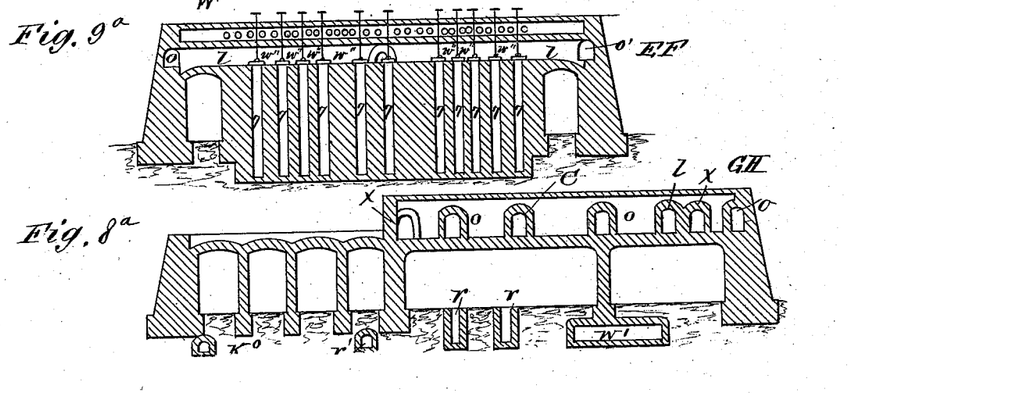

$l$ is a main air-flue, built as shown in Fig. 9ª.

Figure 6A:
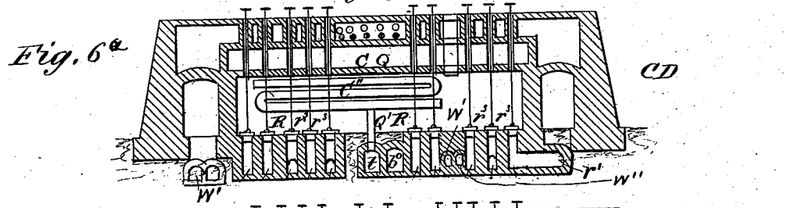

In every combustion-chamber there is a smoke-slot, $r$, connected by small channels $r'$, Fig. 11ª, with the smoke-collecting conduit R, the draft through the slots being regulated by valves $r^3$, as shown in Fig. 6ª. In a similar manner slots W are connected by small channels with the main air-flue $l$, (see Fig. 11ª,)

which are regulated by valves W'', as shown in Fig. 9ª. From the smoke-collecting chamber the flue $b^o$ leads to the chimney.

Figure 12A:
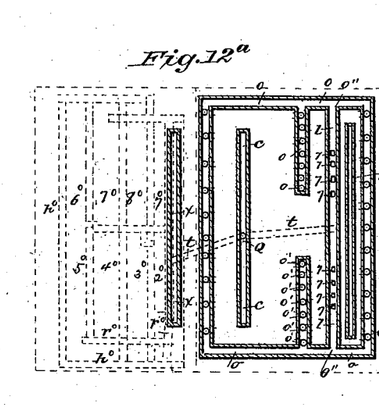

1° to 8° in Fig. 1ª are chambers, in which the manufactured ware is dried previous to being placed in the kiln proper for burning. The heat contained in the lower part of the material already burned is withdrawn through the slots W by opening the corresponding valves in the main air-flue $l$. From the flue $l$ the hot air is conducted to the drying-chambers 1° to 8° by the channel $t$ and drawn into the drying-apartments by the draft of the chimney used for the kiln or by an exhaust fan or blower. The heat in the upper portion of the material already burned is utilized by constructing a system of conduits, $o$, in Fig. 12ª, connected with the main air-flue $l$ at $o''$. Figs. 5ª and 12ª show the position of these passages, also the manner in which the hot air is introduced through the openings $o'$ into the conduits $o$. The influx of hot air is regulated by valves placed where openings $o'$ enter conduits $o$.

In the smoke-collecting chamber R is an iron coiled pipe, $c''$, the upper end of which receives the air from the outside of the kiln. This air enters at Q and passes out at Q' into the conduit $t$.

Figure 11C:
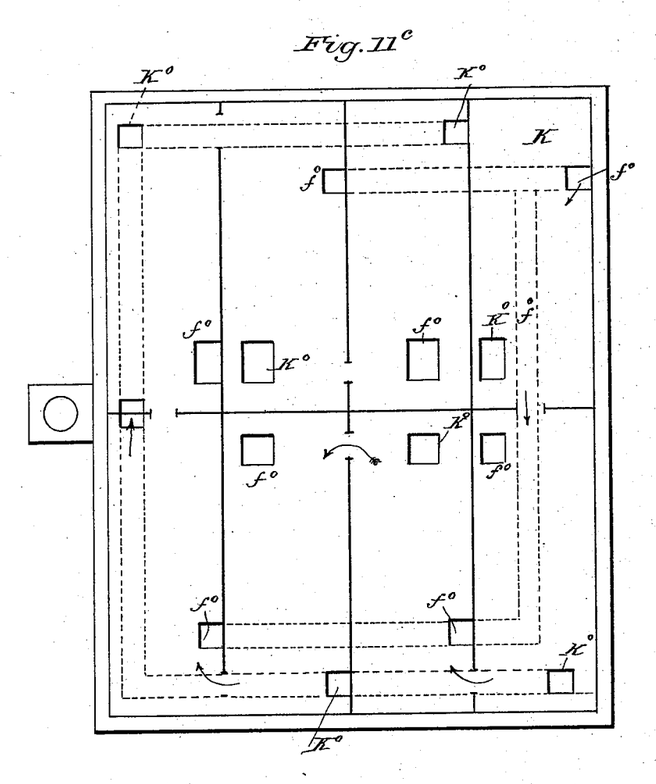
Figure 11D:
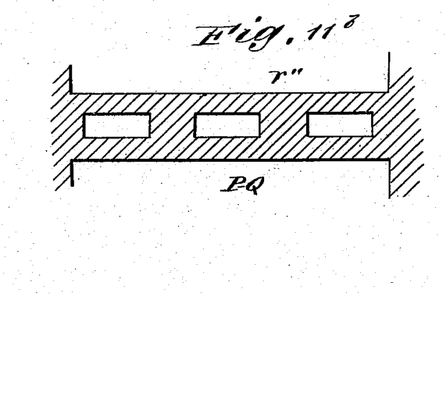
Figure 11E:
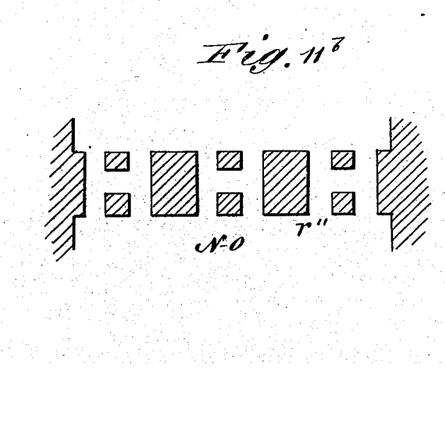

Diagrammatical Fig. 11ᶜ shows the method of operating the drying-apartments.

Apartments 1°, 2°, 3°, 4°, and 5° are supposed to be filled with moist material to be dried. The entrance-doors $f^o$ of apartments 1° to 5° are closed. Connections $n^o$ between 1° and 8° and 5° and 6° are also closed. The hot-air inlet $f^o$ in apartment 1° is open. The draft opening K° in apartment 5° is also open. The heated air discharged out of inlet $f^o$, apartment 1°, will pass in succession through apartments 1°, 2°, 3°, 4°, and 5°, thus drying the ware contained in them, and finally enters the draft-opening K°, and from thence to the chimney. When the ware in apartment 1° has become sufficiently dried, air inlet $f^o$ in this chamber is closed and inlet $f^o$ in apartment 2° is opened. Apartment 6° has been previously filled with moist ware and the opening $n^o$ between 5° and 6° opened. Draft-opening K° in chamber 5° is now closed, and opening K° in chamber 6° is opened. By the alternate opening and closing of the draft and inlet openings the heat is in succession drawn through all the drying-chambers. As the ware to be dried is not suddenly exposed to a high temperature, (the heat gradually increases in the several apartments as they become contiguous to the air-discharging inlet,) there is no danger of the ware being cracked or injured.

It is sometimes desirable to allow the material or ware in a portion of the kiln to remain in it for a long period of time after the burning process has been finished. This is accomplished in the following manner, reference being had to Fig. 1ª: The combustion-channel is longitudinally divided by a wall, thus forming the double chambers I I' and II II'. When the burning process has arrived at P in chamber VIII, the fire can be made to advance simultaneously through chambers I I' and II II' by putting the smoke-slot $r'$ in II and II' in connection with the smoke-collecting conduit R through the corresponding valves. When the ware in I I' and II II' has been burned, chambers I' and II' may be disconnected from the remainder of the kiln by filling with sand the division-walls between I I' and II II'. The fire is then made to progress through chamber III, as already described. This method of operating the kiln has not only the advantage of permitting one portion of the kiln to be isolated from the other part, but also secures a larger production of the manufactured product, as two chambers are thus fired at one time.

Having thus described my invention, what I claim as new, and desire to secure by Letters Patent, is—

1. The combination, in a brick-kiln, of gas-generators J' K', gasometers L' M', combustion-chambers I II III IV V VI VII VIII, apertured partitions $r''$, separating the several chamber, gas-burners 16 in the several chambers, valves for controlling the supply of gas to the gas-burners, conduits for furnishing a draft from each chamber through series of smoke-conduits leading from smoke-slots in the chamber-floors to a smoke-collecting channel, air-ducts for supplying heated air to the ignited gas-burners, air-duct for receiving heated air from the several chambers, and valves for controlling the smoke and air ducts, substantially as shown and described.

2. The combination, in a brick-kiln, of gas-generators J' K', gasometers L M, combustion-chambers I II III IV V VI VII VIII, apertured partitions $r''$, separating the several chambers, gas-burners 16 in the several chambers, valves for controlling the supply of gas to the gas-burners, means, substantially as described, for furnishing a draft from each chamber to the smoke-chimney, air-ducts for supplying heated air to the ignited gas-burners, air-ducts for receiving the heated air from the several chambers, valve for controlling the smoke and air ducts, and the drying-apartments 1° 2° 3° 4° 5° 6° 7° 8°.

3. A kiln provided with the double combustion-chambers I I' and II II', series of air-ducts leading from air-slots in the combustion-chamber floors to a main air-flue, smoke-slots in the combustion-chamber floors, air-pipes $d$ and $n$, located above the combustion-chamber arches, and the coil $c''$ in the smoke-collecting chamber R, substantially as shown and described.

In testimony whereof I affix my signature in presence of two witnesses.

JACOB BÜHRER.

Witnesses:
EMIL BLUM,
ROBERT OSTERMAYER.